(12) United States Patent
Bergman et al.

(10) Patent No.: US 8,640,034 B2
(45) Date of Patent: Jan. 28, 2014

(54) REMOTE GUI CONTROL BY REPLICATION OF LOCAL INTERACTIONS

(75) Inventors: Lawrence D. Bergman, Mt. Kisco, NY (US); Vittorio Castelli, Croton On Hudson, NY (US); Tessa A. Lau, Mountain View, CA (US); Daniel A. Oblinger, Washington, DC (US)

(73) Assignee: International Business Machines Corporation, Armonk, NY (US)

( * ) Notice: Subject to any disclaimer, the term of this patent is extended or adjusted under 35 U.S.C. 154(b) by 1394 days.

(21) Appl. No.: 11/560,384

(22) Filed: Nov. 16, 2006

(65) Prior Publication Data

US 2008/0120553 A1    May 22, 2008

(51) Int. Cl.
*G06F 3/00*    (2006.01)

(52) U.S. Cl.
USPC ............ 715/740; 707/999.104; 707/E17.044; 715/733; 715/700; 715/762

(58) Field of Classification Search
USPC .................................. 715/740, 704, 762, 700
See application file for complete search history.

(56) References Cited

U.S. PATENT DOCUMENTS

| | | | |
|---|---|---|---|
| 5,640,537 A * | 6/1997 | Jessen et al. | 703/23 |
| 5,644,652 A | 7/1997 | Bellegarda et al. | |
| 6,009,452 A | 12/1999 | Horvitz | |
| 6,021,403 A | 2/2000 | Horvitz et al. | |
| 6,134,644 A | 10/2000 | Mayuzumi et al. | |
| 6,260,035 B1 | 7/2001 | Horvitz et al. | |
| 6,384,843 B1 | 5/2002 | Harel | |
| 6,466,908 B1 | 10/2002 | Baggenstoss | |
| 6,587,125 B1 | 7/2003 | Paroz | |
| 6,615,240 B1 | 9/2003 | Sullivan et al. | |
| 6,948,157 B2 | 9/2005 | Larsson et al. | |
| 7,000,187 B2 | 2/2006 | Messinger et al. | |
| 7,559,057 B2 | 7/2009 | Castelli et al. | |
| 2003/0236775 A1 * | 12/2003 | Patterson | 707/3 |

(Continued)

FOREIGN PATENT DOCUMENTS

| | | |
|---|---|---|
| CN | 1855021 A | 11/2006 |
| EP | 1727027 A2 | 11/2006 |
| EP | 1727027 A3 | 11/2006 |

OTHER PUBLICATIONS

Hui-Ling Lou, "Implementing the Viterbi Algorithm," 1995, pp. 42-52, IEEE Signal Processing Magazine.

(Continued)

*Primary Examiner* — Tadeese Hailu
*Assistant Examiner* — Darrin Hope
(74) *Attorney, Agent, or Firm* — Louis J. Percello; Hoffman Warnick LLC (57) ABSTRACT

Under the present invention, an illustrative feature is to provide a method and system/structure for remotely controlling multiple computer systems by interacting with GUIs. Specifically, the present invention allows a controlled computer/system to be remotely controlled via a controlling computer/system. To this extent, data/action capture instrumentation is provided on the controlling system for automatically creating a representation of content of the GUI of the controlling system, for automatically observing a set of actions performed by a user on the GUI of the controlling system, for automatically creating a representation of the observed actions, and for sending to the controlled system the representation of the observed actions. In addition, execution instrumentation is provided on the controlled system for receiving the representation and replicating the actions on the controlled system by interacting with a GUI of the controlled system.

23 Claims, 5 Drawing Sheets

(56) References Cited

U.S. PATENT DOCUMENTS

| | | |
|---|---|---|
| 2004/0130572 A1 | 7/2004 | Bala |
| 2005/0060719 A1* | 3/2005 | Gray et al. .................... 719/318 |
| 2005/0144150 A1* | 6/2005 | Ramamurthy et al. ......... 706/45 |
| 2007/0094620 A1 | 4/2007 | Park |

OTHER PUBLICATIONS

Bengio, et al., "Input-Output HMM's for Sequence Processing," 1996, pp. 1231-1249, IEEE Transactions on Neural Networks, vol. 7, No. 5.

Lawrence R. Rabiner, "A Tutorial on Hidden Markov Models and Selected Applications in Speech Recognition," 1989, pp. 257-286, Proceedings of the IEEE, vol. 77, No. 2.

Singer et al., "Maximum Likelihood Successive State Splitting," 1996, pp. 601-604, ATR Interpreting Telecommunications Res. Labs, Japan, ECS Department, Boston University, IEEE.

Dugad et al., "A Tutorial on Hidden Markov Models," 1996, pp. 1-16, Signal Processing and Artificial Neural Networks Laboratory, Department of Electrical Engineering, Indian Institute of Technology, Bombay, India.

Jeff A. Bilmes, "A Gentle Tutorial of the EM Algorithm and its Application to Parameter Estimation for Gaussian Mixture and Hidden Markov Models," 1998, pp. 1-13, International Computer Science Institute, Department of Electrical Engineering and Computer Science, U.C. Berkeley, California.

Barron, et al., "The Minimum Description Length Principle in Coding and Modeling," 1998, pp. 2743-2760, IEEE Transactions on Information Theory, vol. 44, No. 6.

Arne Leijon, "HMM Training: Practical Aspects," 2003. pp. 1-3.

Unknown, "Information Disclosures Statement," IBM China Ltd letter, Nov. 21, 2008, 2 pages.

Dillmann et al., "Programming by demonstration: A machine learning approach to support skill acquision for robots", 1996, Abstract only, retrieved online at http://www.springerlink.com/content/f471m35173l13763.pdf.

Lau et al., "Programming by demonstration using version space algebra", Oct. 2001, 60 pages, retrieved online at http://www.cs.washington.edu/homes/pedrod/papers/mlj02.pdf.

Roweis, "SCIA 2003 Tutorial: Hidden Markov Models", Jun. 2003, 10 pages, retrieved online at http://www.cs.toronto.edu/~roweis/notes/scia03h.pdf.

Lau, "Programming by demonstration: A machine learning approach", 2001, 139 pages, retrieved online at http://www.tlau.org/research/.

Bergman, U.S. Appl. No. 10/630,959, filed Jul. 30, 2003, Office Action Summary, Nov. 7, 2006, 16 pages.

Bergman, U.S. Appl. No. 10/630,959, filed Jul. 30, 2003, Office Action Summary, May 8, 2007, 20 pages.

Bergman, U.S. Appl. No. 10/630,959, filed Jul. 30, 2003, Office Action Summary, Jan. 22, 2008, 22 pages.

Bergman, U.S. Appl. No. 10/630,959, filed Jul. 30, 2003, Office Action Summary, Aug. 11, 2008, 20 pages.

Castelli, U.S. Appl. No. 10/729,736, filed Dec. 5, 2003, Office Action Summary, Jul. 17, 2006, 17 pages.

Castelli, U.S. Appl. No. 10/729,736, filed Dec. 5, 2003, Office Action Summary, Nov. 20, 2006, 18 pages.

Castelli, U.S. Appl. No. 10/729,736, filed Dec. 5, 2003, Office Action Summary, May 26, 2007, 13 pages.

Castelli, U.S. Appl. No. 10/729,736, filed Dec. 5, 2003, Office Action Summary, Sep. 11, 2007, 16 pages.

Castelli, U.S. Appl. No. 10/729,736, filed Dec. 5, 2003, Office Action Summary, May 21, 2008, 10 pages.

Castelli, U.S. Appl. No. 10/729,736, filed Dec. 5, 2003, Office Action Summary, Sep. 9, 2008, 10 pages.

Castelli, U.S. Appl. No. 10/729,736, filed Dec. 5, 2003, Notice of Allowance and Fee(s) Due, Mar. 6, 2009, 11 pages.

Oblinger, U.S. Appl. No. 10/972,028, filed Oct. 22, 2004, Office Action Summary, Jul. 25, 2008, 13 pages.

Oblinger, U.S. Appl. No. 10/972,028, filed Oct. 22, 2004, Office Action Summary, Jan. 22, 2009, 11 pages.

Bergman et al., U.S. Appl. No. 11/560,383, filed Nov. 16, 2006, Office Action Summary, May 28, 2009, 25 pages.

Bergman, U.S. Appl. No. 11/560,383, filed Nov. 16, 2006, Office Action Communication dated Dec. 30, 2009, 24 pages.

Hwang et al., "Nonparametric Multivariate Density Estimation: A Comparative Study" IEEE Transactions on Signal Processing, vol. 42, No. 10, Oct. 1994, pp. 2795-2810.

Hope, U.S. Appl. No. 11/560,383, Office Action Communication, Jan. 19, 2012, 23 pages.

Hope, Office Action Communication for U.S. Appl. No. 11/560,383 dated Aug. 1, 2012, 20 pages.

Hope, Notice of Allowance and Fees Due for U.S. Appl. No. 11/560,383 dated Jul. 22, 2013, 14 pages.

\* cited by examiner

REMOTE GUI CONTROL BY REPLICATION OF LOCAL INTERACTIONS

CROSS-REFERENCE TO RELATED APPLICATIONS

This application is related to the following U.S. patent applications:

Title "METHOD AND SYSTEM FOR MAPPING GUI WIDGETS" filed concurrently herewith, Ser. No. 11/560,383; Ser. No. 10/630,959, entitled "SYSTEMS AND METHODS FOR GENERATING AND DISTRIBUTING EXECUTABLE PROCEDURES FOR TECHNICAL DESK-SIDE SUPPORT" and filed on Jul. 3, 2003; Ser. No. 10/729,736, entitled "ALIGNMENT AND GENERALIZATION OF DEMONSTRATED PROCEDURE TRACES" and filed on Dec. 5, 2003; Ser. No. 10/972,028, entitled "METHOD FOR INDUCING A HIDDEN MARKOV MODEL WITH A SIMILARITY METRIC" and filed on Oct. 22, 2004, each of which is assigned to the present assignee and is incorporated herein by reference, in its entirety.

BACKGROUND OF THE INVENTION

1. Field of the Invention

The present invention generally relates to a method and apparatus for remote control of one or more computer systems by means of replications of actions.

2. Related Art

Consider the problem of remotely controlling a computer system (denoted by the term controlled computer system) by interacting with its graphical user interface (GUI). The term remotely refers to the situation in which the user interacts directly with a different computer system (denoted by the term controlling computer system). This is a common problem, for which a variety of solutions exist.

A first class of approaches well known in the art consists of rendering individual components of the GUI of the controlled computer system on the controlling computer system. An example of this class of solutions is the X-windows windowing system, where the controlling computer executes an X-server, which renders GUI components of the controlled systems. In this case, the GUIs of applications running on the controlled system are displayed on the screen of the controlling system by the X-server. Using these approaches, the user actually interacts with the GUI of applications running on the controlled system. One main limitation of these approaches is that the operating system of the controlled system must support this type of GUI rendering. Common operating systems, like several members of the Microsoft Windows (Microsoft, Windows and related terms are trademarks of Microsoft, Inc. of Redmond, Wash.) family of operating systems, do not support natively this approach.

A second class of approaches consists of replicating on the controlling computer system the content of the GUI of the controlled computer system, and providing mechanisms for the user to interact with this replica of the GUI. This approach is used, for example, by the freeware software package called VNC and by common e-meeting software that allow users to remotely interact with the GUI of the computer of other users. In these approaches, the GUI of the controlled system is rendered on the controlled system itself (unlike in the case of X-Windows, where it is actually rendered on the controlling system). A program on the controlled system produces a description of the visual content of the GUI (for example, a bitmap), and sends it to the controlling system. On the controlling system, another program renders this description to the user and observes the user actions on the rendered description. When the user hits a key or performs a mouse operation, the program on the controlling system sends to the program on the controlled system a description of the action: for example, when the user clicks the mouse, the description contains the button (right-center-left), the click (up-down) and the position in pixel of the mouse. The program on the controlled system identifies the widget the user wants to interact with, for example using the coordinates of the mouse, and performs the desired action. The program on the controlled system sends updated descriptions of the GUI content to the program on the controlling system. In these approaches, the user does not interact directly with the GUI of the controlled system, but the programs on the controlling and controlled system provide the user with the illusion of a direct interaction. One main limitation of these approaches is the need of a fast and reliable network link between the controlled and controlling systems (in order to ensure an acceptable user experience).

Clearly, neither approach is well-suited for simultaneous control of multiple controlled systems. In particular, neither approach supports the ability of simultaneously performing the same action on multiple controlled computer systems where the action consists of GUI interactions.

There are two main approaches to the problem of replicating the same action across multiple controlled computer systems. The first approach consists of writing a program that performs the desired interaction, distributing the program to each controlled computer system, and executing it. The main limitation of this approach is the cost: writing and testing a program is an expensive and time-consuming operation, and is therefore suitable for complex or repetitive operations that can be planned long before they are executed.

The second approach consists of using a macro recorder. A macro recorder observes the interactions of the user with the GUI in terms of low-level operations, and records them in a format that is then executable by an appropriate program, potentially on a different system. Macro recorders typically use very low-level description of actions (e.g., "perform a mouse click at a certain coordinate relative to the last created window"). The main limitation of macro recorders is brittleness: changes in the environment (for instance, in the position, size, or appearance of windows) confuse a macro recorder, and the execution consequently fails to complete correctly. Both macro recorders and programs are also brittle with respect to unexpected circumstances. This brittleness can be reduced in programs by increasing the complexity of the design to cope with different failure types.

In view of the foregoing there exists a need for a mechanism for remotely controlling a GUI by local interactions.

SUMMARY OF THE INVENTION

Under the present invention, an illustrative feature is to provide a method and system/structure for remotely controlling multiple computer systems by interacting with GUIs. Specifically, the present invention allows a controlled computer/system to be remotely controlled via a controlling computer/system. To this extent, data/action capture instrumentation is provided on the controlling system for automatically creating a representation of content of the GUI of the controlling system, for automatically observing a set of actions performed by a user on the GUI of the controlling system, for automatically creating a representation of the observed actions, and for sending to the controlled system the representation of the observed actions. In addition, execution instrumentation is provided on the controlled system for receiving the representation and replicating the actions on the controlled system by interacting with a GUI of the controlled system.

The data/action capture instrumentation can further determine changes to the content of the GUI of the controlling system based on the set of actions performed by the user. Also, the representation of the observed action can comprise the type of action performed by the user, and a representation of at least one GUI component on which the action has been performed. Along these lines, the representation of the at least one GUI component on which the action has been performed can comprise a smallest representation necessary to distinguish each of the at least one GUI component from all other GUI components on the controlling computer. Still yet, the data/action capture instrumentation can send a request for further information from the controlled computer to the controlling computer when the controlled computer cannot uniquely identify a GUI component from the representation. This further information can comprise a complete representation of the at least one GUI component identified by the controlled computer using the representation sent by the controlling computer.

A first aspect of the present invention provides a method for controlling remotely at least one controlled computer via a controlling computer, comprising: automatically replicating on a Graphical User Interface (GUI) of the at least one controlled computer a set of actions performed by a user on a GUI of the controlling computer.

A second aspect of the present invention provides a system for remotely controlling a controlled computer via a controlling computer, comprising: data/action capture instrumentation on the controlling computer for automatically creating a representation of content of the GUI of the controlling computer, for automatically observing a set of actions performed by a user on the GUI of the controlling computer, for automatically creating a representation of the observed actions, and for sending to the controlled computer the representation of the observed actions.

A third aspect of the present invention provides a program product stored on a computer readable medium for remotely controlling a controlled computer via a controlling computer, the computer readable medium comprising program code for causing the controlling computer system to perform the following: automatically create a representation of content of the GUI of the controlling computer; automatically observe a set of actions performed by a user on the GUI of the controlling computer; automatically create a representation of the observed actions; and send to the controlled computer the representation of the observed actions.

A fourth aspect of the present invention provides a method for deploying a system for remotely controlling a controlled computer via a controlling computer, comprising: providing a computer infrastructure being operable to: automatically create a representation of content of the GUI of the controlling computer; automatically observe a set of actions performed by a user on the GUI of the controlling computer; automatically create a representation of the observed actions; and send to the controlled computer the representation of the observed actions.

BRIEF DESCRIPTION OF THE DRAWINGS

The foregoing and other exemplary purposes, aspects and advantages will be better understood from the following detailed description of an exemplary embodiment of the invention with reference to the drawings.

DETAILED DESCRIPTION OF THE INVENTION

In this document, the following terms and abbreviations are used:

System denotes any arrangement of computer hardware and/or software such as a single software program, a single computer system, and/or a computer infrastructure containing multiple pieces of hardware and/or software;

GUI is an abbreviation for Graphical User Interface; and

Widget denotes any component of the GUI with which the user can interact.

As indicated above, an illustrative feature of the present invention is to provide a method and system/structure for remotely controlling multiple computer systems by interacting with GUIs. Specifically, the present invention allows a controlled computer (system) to be remotely controlled via a controlling computer (system). To this extent, data/action capture instrumentation is provided on the controlling computer for automatically creating a representation of content of the GUI of the controlling computer, for automatically observing a set of actions performed by a user on the GUI of the controlling computer, for automatically creating a representation of the observed actions, and for sending to the controlled computer the representation of the observed actions. In addition, execution instrumentation is provided on the controlled computer for receiving the representation and replicating the actions on the controlled computer by interacting with a GUI of the controlled computer.

The data/action capture instrumentation can further determine changes to the content of the GUI of the controlling system based on the set of actions performed by the user. Also, the representation of the observed action can comprise the type of action performed by the user, and a representation of at least one GUI component on which the action has been performed. Along these lines, the representation of the at least one GUI component on which the action has been performed can comprise a smallest representation necessary to distinguish each of the at least one GUI component from all other GUI components on the controlling computer. Still yet, the data/action capture instrumentation can send a request for further information from the controlled computer to the controlling computer when the controlled computer cannot uniquely identify a GUI component from the representation. This further information can comprise a complete representation of the at least one GUI component identified by the controlled computer using the representation sent by the controlling computer.

Figure 1:
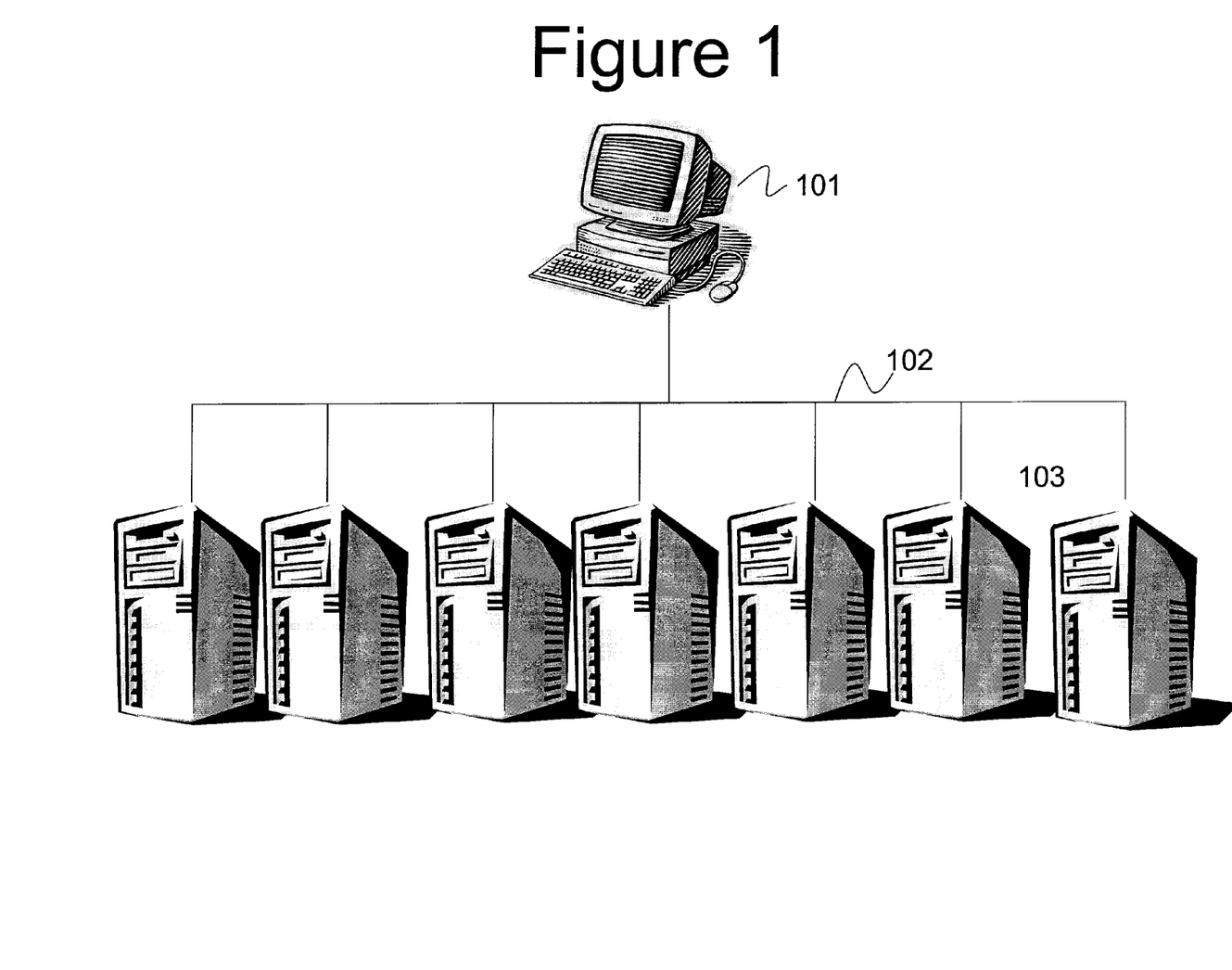
FIG. 1 depicts a computer system having features of the present invention.

Referring now to FIG. 1, a computer system 101 having features of the present invention is shown. A system administrator (or, more generally, a user) uses a controlling system 101 to control a collection of at least one controlled systems 103, connected via an interconnection network 102. In contrast to all the methods described in the prior art, in the method taught in the present invention, the user performs a task on controlling system 101. The controlling system 101 need not show an image the GUIs of the controlled systems 103, nor runs a server that allows the GUIs of controlled systems 103 to be rendered on controlling system 101. In contrast, in the current invention, the user performs a task on his/her computer 101. For example, assume that the task is to install an application on all controlled systems 103, under the present invention, the user or another party will install the application on controlling system 101.

Figure 2:
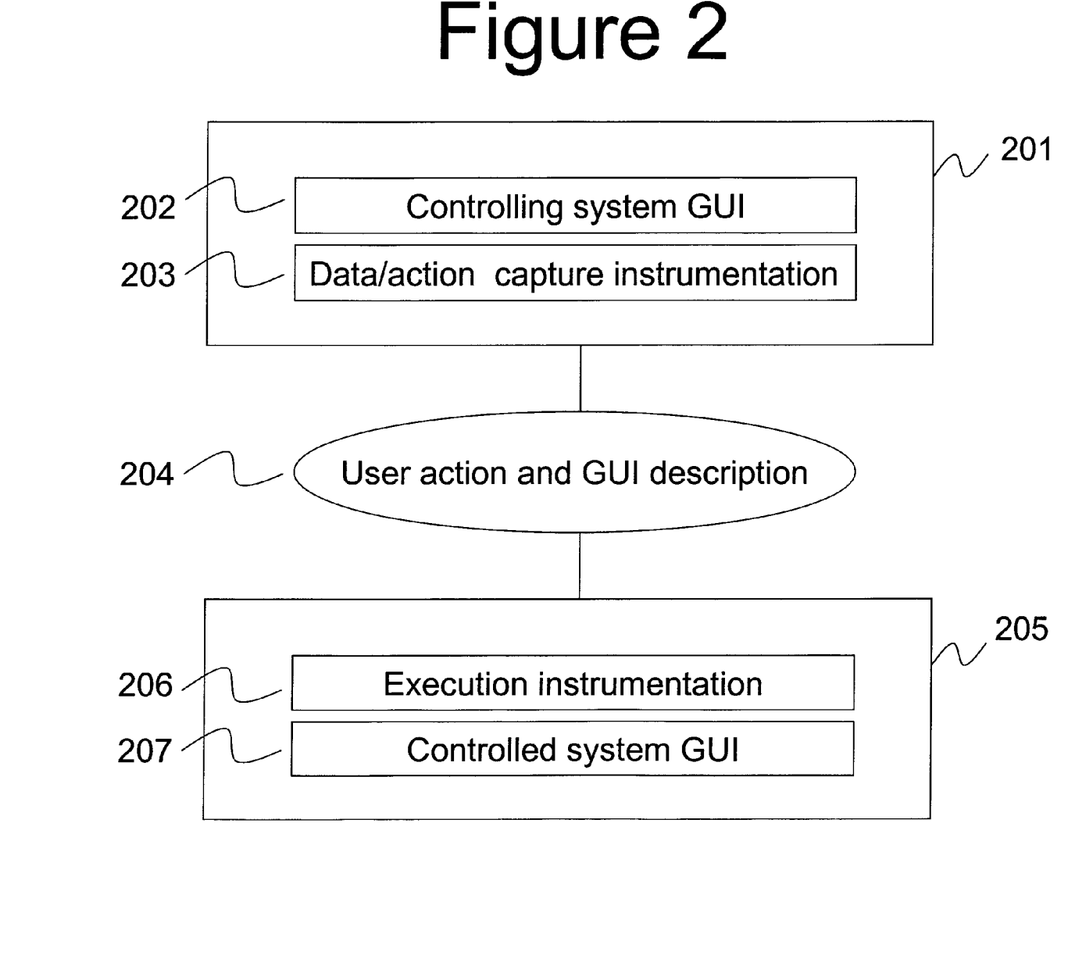
FIG. 2 depicts system of the current invention

FIG. 2 describes how the present invention enables the simultaneous remote control of multiple computer/systems. Specifically, as the user performs a task on GUI 202 of controlling system 201, a program or collection of programs and/or hardware called data/action capture instrumentation 203, running on controlling system 201, observes the actions of the user and the reactions of the applications with which the user interacts. User actions create events that are typically captured at the operating system level. Within the operating system, these events may be translated into higher-level events, which are then passed to the application with which the user interacts. For example, the events of pressing down on the button of a mouse, releasing the button, then repeating, can be translated into the higher-level event of a double click. Most modern operating systems facilitate the registration of callback functions, called for example "hooks", which are invoked when a specific event occurs. By registering appropriate callback functions, data action capture instrumentation 203 is notified of actions taken by the user, and can construct a description/representation of each observed action. This description/representation typically comprises the type of action taken, and data required to identify the GUI component on which the action was performed (discussed in further detail later). Similarly, data/action capture instrumentation 203 registers callback functions with the operating system to be notified of changes in the content of the GUI 202 of the applications with which the user interacts.

By means of appropriate function calls, data/action capture instrumentation 203 obtains a description/representation of the content of the GUI components that are visible to the user and of their changes due to user actions. The result is a user action and GUI description/representation 204 that is broadcasted to the controlled systems 205 as a representation (e.g., in a markup language such as XML) Each controlled system 205 runs execution instrumentation 206 that receives the user action and GUI description/representation 204. It should be understood that description/representation 204 can include one or more data objects. That is, the description/representation of GUI 202 can be separate from the description/representation of the observed actions. They are collectively referred to herein as user action and GUI description/representation 204 for simplicity purposes.

In any event, similar to data/action capture instrumentation 203, execution instrumentation 206 can observe the content of the GUI 207 of controlled system 205 on which it runs and can observe actions being performed on controlled system 205 via its GUI 207. Additionally, execution instrumentation 206 contains hardware and/or software for activating controls of applications having GUIs 207 displayed on controlled system 205. One of ordinary skill in the art would recognize that such means for activating controls of applications are well known, and used, for example, by macro executors or by applications like Virtual Network Computing (VNC). VNC is a desktop sharing system which uses the Remote Frame Buffer (RFB) protocol to remotely control another computer. It transmits the keyboard presses and mouse clicks from one computer to another relaying the screen updates back in the other direction, over a network.

VNC is platform-independent: a VNC viewer on any operating system can connect to a VNC server on any other operating system. There are clients and servers for almost all operating systems and for Java. Multiple clients may connect to a VNC server at the same time. Popular uses of the technology include remote technical support, and accessing files on one's work computer from one's home computer.

VNC was originally developed at AT&T. The original VNC source code is open source under the GNU General Public License, as are many of the variants of VNC available today.

In any event, execution instrumentation 206 receives the user action and GUI description/representation 204 and replicates the action on controlled system 205 by interacting with the controlled system's GUI 207. One of ordinary skills in the art would appreciate that the data/action capture instrumentation 203 and execution instrumentation 206 can alternatively register callbacks with individual applications or with platforms (such as a Java Virtual system) instead of (or in addition to) with the operating system if the goal is to remotely control individual applications or sets of applications running on a specific platform other than the operating system.

In a typical embodiment, the user starts data/action capture instrumentation 203 and controlled systems 205 are then notified that a controlling operation is about to begin, by the data/action capture instrumentation 203 or by another software component working in concert with data/action capture instrumentation 203. Thereafter, data/action capture instrumentation 203 collects a description of the "screen" of controlling system 201. In a typical embodiment, this description consists of the window hierarchy of GUI 202 of the application running on controlling system 201, with information on each window in the hierarchy, such as its class, its state, its content, etc. When a description of GUI 202 has been gathered, data/action capture instrumentation 203 registers the callback functions. Then, data/action capture instrumentation 203 is ready to operate, and the user is notified that he can begin to perform the task.

When the user notifies the data/action capture instrumentation 203 that the operation has completed, controlled systems 205 are notified that the operation has ended, and the data/action capture instrumentation 203 de-registers the callback functions and stops. When one of the callback functions detecting changes in the user interface is invoked, the data/action capture instrumentation 203 updates its description of GUI 202. When a callback function detecting user actions is invoked, data/action capture instrumentation 203 records the content of GUI 202 produces a description/representation 204 of the user action and of the target widget (GUI component) or widgets, and sends a message to controlled system 205 containing the action and target widget or widgets description.

In a typical embodiment, the description of the action is in terms of low-level events (e.g., down click of right mouse button). In another embodiment, the description of the action is at a higher level of abstraction (e.g., drag-and-drop, or select-item-from-list). Certain actions involve a single widget (e.g., clicking a push button or checking a check box) while other actions involve multiple widgets (e.g.: dragging an object from a container to a different container involves three widgets: the dragged object, the source container, and the destination container.)

In addition, the description of a window or widget includes of information for identifying the top-level window to which the widget belongs, and information on how to traverse the widget hierarchy to identify the widget. Still yet, the information for identifying the top level window includes the name of the application owning the window, the name of the class of the window, and the title of the window. Information on how to traverse the widget hierarchy generally comprises the name of the class and the text of each window in the hierarchy path from the root (i.e., the containing window) to the target widget. The co-pending patent application entitled "METHOD AND SYSTEM FOR MAPPING GUI WIDGETS" incorporated by reference above describes means for using soft and hard constraints to robustly identifying windows and widgets. In the spirit of the current invention, the description of a target widget could be composed of the constraints taught in the co-pending patent application.

Figure 3:
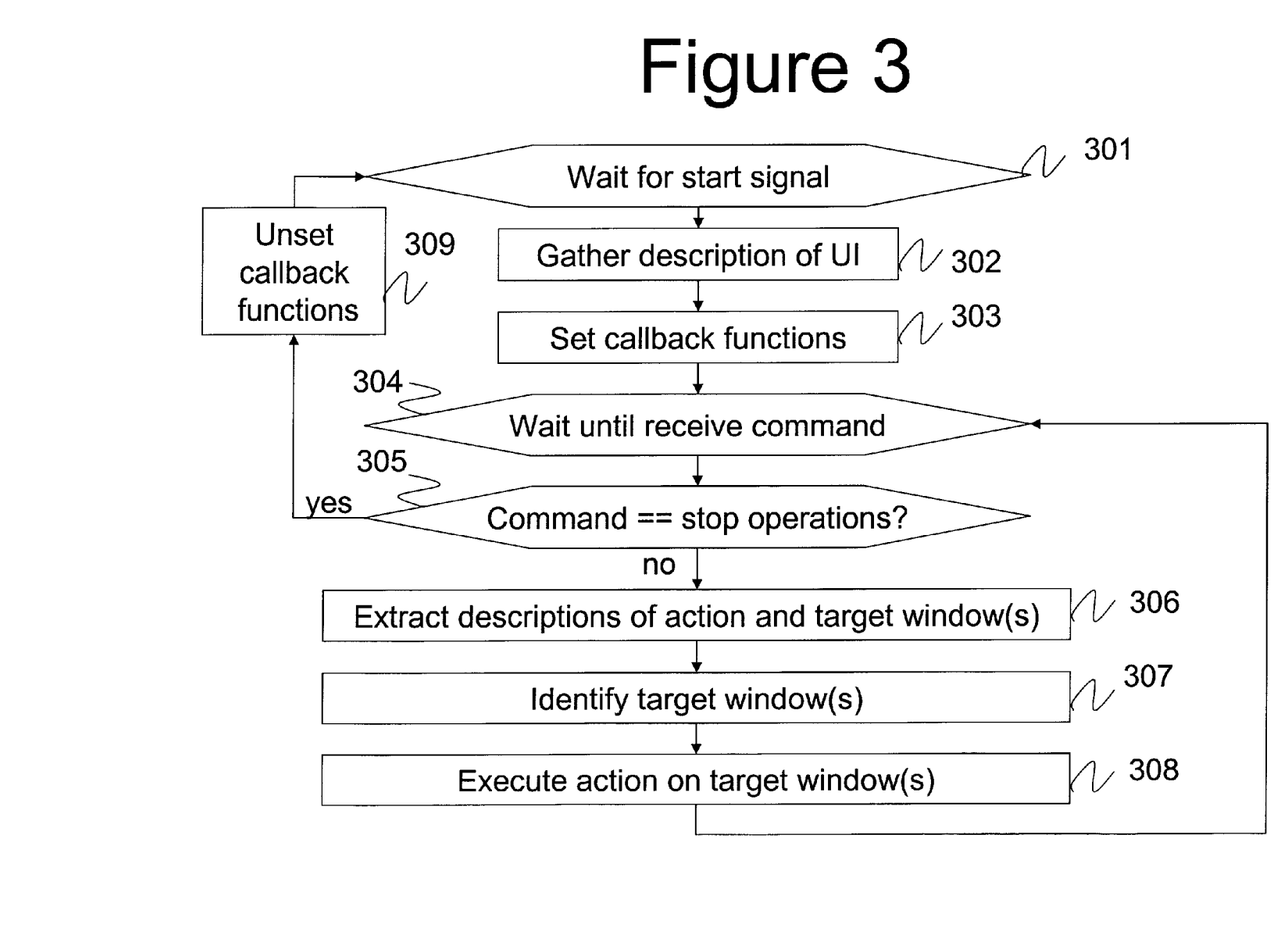
FIG. 3 depicts a method for replicating on a controlled computer actions performed on a controlling computer.

FIG. 3 shows the operation of the execution instrumentation 206 shown in FIG. 2. In step 301 the execution instrumentation waits for a command from the controlling system indicating that the execution instrumentation should start operations. When this signal is received the execution instrumentation continues to Step 302, where it gathers a description of the GUI of the controlled system on which it runs. In step 303 the execution instrumentation sets the callback functions. In a typical embodiment, the execution instrumentation has a component (not described in FIG. 3) that continuously updates the description of the GUI as described above. In Step 304, the execution instrumentation waits for a command from the controlling system. When a command is received, Step 304 determines whether the command is to stop the current operation. If the received message is to stop operations, the execution instrumentation deregisters the callback functions (Step 309) and continues operations from step 301. One of ordinary skills in the art would appreciate that this particular step is not necessary: the execution instrumentation could continue to respond to callback functions and update the description of the controlled system GUI.

If the command is to execute an action, the execution instrumentation continues from Step 306, where it extracts from the message the description of the action and of the target windows. In Step 307, the execution instrumentation identifies the target window(s). This is typically done, by matching the description of each target window with the internal representation of the GUI obtained in Step 302 and continuously updated as described above. In Step 308, the action is executed on the target window(s). One of ordinary skills in the art would appreciate that modern operating systems and platforms provide mechanisms for automating tasks by programmatically operating on selected widgets. The mechanisms range from the ability of emulating mouse and keyboard events to APIs for performing specific actions on specific widgets. When Step 308 is completed, the execution instrumentation continues from Step 304.

It is important to ensure that only one action at a time is executed on the controlled system. Since the actual execution of actions could be asynchronous with the operations of the execution instrumentation, in a preferred embodiment the transition from Step 308 to Step 304 occurs only when the callback functions that detect actions on the controlled system GUI are activated and report that the action executed in Step 308 has been actually performed on the appropriate GUI elements. In a preferred embodiment the description of each widget depicted in 204 in FIG. 2, and extracted by a controlled system in Step 306 by the execution instrumentation is the minimal description necessary to uniquely identify the widget on the controlling system. The controlling system, that maintains a description of its own GUI, can for example determine a minimal description for each the widget as follows: (1) start with a small description of the widget (for example, the name of the application owning the widget, the type and the text of the widget); (2) identify all the widgets satisfying the description created in step 1; (3) if more than one widget satisfies the description, determine what additional information discriminates between the widgets satisfying the current description and add the description. Examples of additional information include properties of the target widget, properties of the windows on the path from the target widget to its root window, properties of siblings of the target widget, and properties of other widgets and windows having the same root window as the target widget. In a preferred embodiment, a controlled system receiving a command and determining that the command is not a stop operation (as in step 305), extracts the description of the target window or windows in Step 306, and identifies the target window(s) in step 307.

Figure 4:
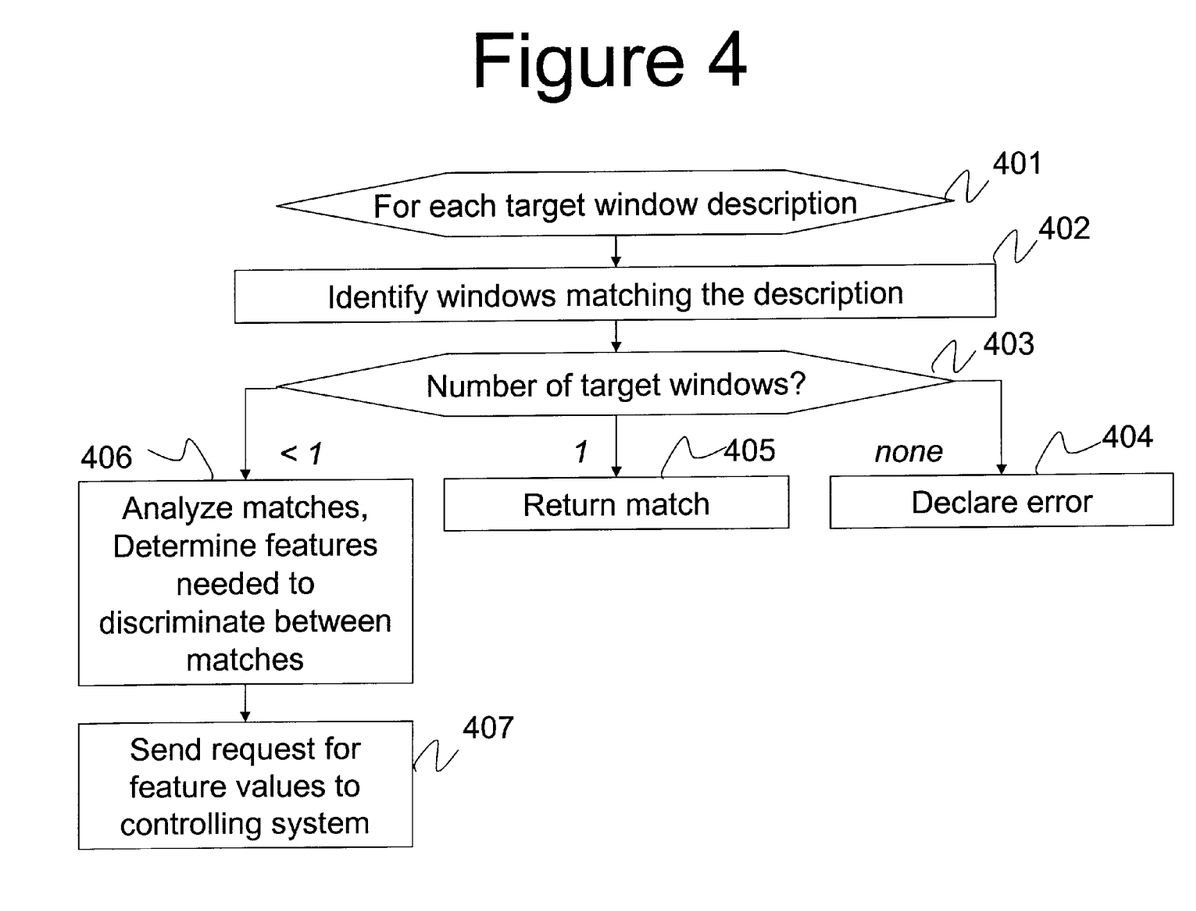
FIG. 4 depicts a method for determining a minimal description uniquely identifying a UT component on the controlling computer.

In general, the processing of these descriptions to identify the target window(s) proceeds as illustrated in FIG. 4. Step 401 iterates on each target window description. In step 402 the execution instrumentation identifies candidate target windows, by matching the current description selected by the iteration step 401 with the description of the GUI content gathered in Step 302 and updated when the callback functions set in Step 303 are invoked. Step 403 determines the flow of operations depending on the number of candidate target windows. If there are no matches, step 404 declares an error, or takes corrective actions as described later. If there is a unique match, step 405 returns the match, which is then used in Step 308.

If more than one candidate target window matches the target window description, the execution instrumentation determines in step 406 the information necessary to uniquely discriminate between the windows matching the target window description in a manner analogous to that described above to generate the description. When step 406 completes, the execution instrumentation sends a request for the necessary information to the controlling system (step 407) and waits for the controlling system to provide it. This feature of the invention provides means for overcoming limitations resulting from possible differences in the content of the GUI of different controlled systems. Note that Step 404 could be invoked because the effects of a previous action are not yet visible on the GUI of the controlled system. As a consequence, in a different embodiment, the execution GUI does not immediately declare an error, but temporarily suspends operations and waits for the effect of the previous actions to result in changes to the GUI. Under the present invention, the execution of the same task by the execution instrumentation on the individual controlled system need not occur in parallel at the same time, but need not be executed synchronously (and in fact, it could be executed at very different points in time according to the this invention).

Figure 5:
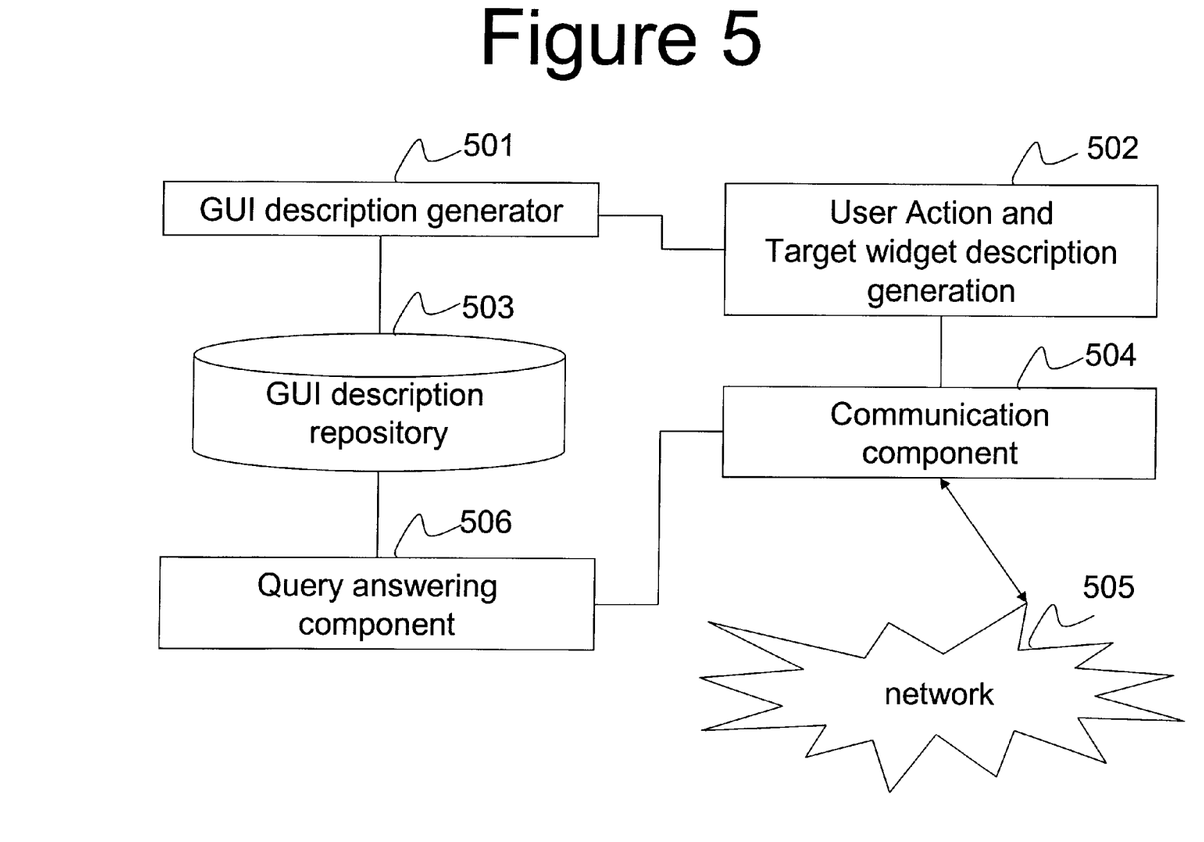
FIG. 5 depicts a data/action capture instrumentation having features of the current invention.

In order to support the execution of a task on multiple controlled systems at different points in time, the controlling system must provide means for answering the queries issued in Step 407. FIG. 5 depicts a diagram of the data/action capture instrumentation supporting this behavior. Component 501 contains the callback functions and the code required to produce a description of the GUI. Component 502 contains the callback functions that respond to user actions. Upon detecting a user action, this component requests the target widget description from component 501. Component 501 produces the description of the target widgets, and saves the description of the GUI content to a GUI repository 503. The description is associated with an identifier that will be part of the user action target widget description. The communication component 504 sends this description over the network 505 to the controlled systems. When a controlled system sends a request for additional information as described in Step 407, the communication component routs the request to the query answering component 506. This request contains means to identify the specific action for which the controlled system needs information, as well as a specification of the desired information, as previously described. The query answering component uses the information used to identify the action to retrieve the corresponding GUI description from the GUI repository, and uses this description to answer the query by retrieving the appropriate information.

While shown and described herein as remote computer control solution, it is understood that the invention further provides various alternative embodiments. For example, in one embodiment, the invention provides a computer-readable/useable medium that includes computer program code to enable a computer infrastructure to remotely control one or more computers. To this extent, the computer-readable/useable medium includes program code that implements each of the various process of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to remotely control one or more computers. In this case, the service provider can create, maintain, deploy, support, etc., a computer infrastructure that performs the process of the invention for one or more customers. In return, the service provider can receive payment from the target organization(s) under a subscription and/or fee agreement and/or the service provider can receive payment from the sale of advertising content to one or more third parties.

In still another embodiment, the invention provides a computer-implemented method for remotely controlling one or more computers. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of (1) installing program code on a device such as controlling and/or controlled computer systems, from a computer-readable medium; (2) adding one or more devices to the computer infrastructure; and (3) incorporating and/or modifying one or more existing systems of the computer infrastructure to enable the computer infrastructure to perform processes according to one or more aspects of the invention.

As used herein, it is understood that the terms "program code" and "computer program code" are synonymous and mean any expression, in any language, code or notation, of a set of instructions intended to cause a device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular providing and/or I/O device, and the like.

Aspects of the invention can take the form of an entirely software embodiment or an embodiment containing both hardware and software elements. In an embodiment, aspects of the invention are implemented in software, which includes but is not limited to firmware, resident software, microcode, etc. Furthermore, aspects of the invention can take the form of a computer program product accessible from at least one computer-usable or computer-readable medium storing program code for use by or in connection with a computer or any instruction execution system. For the purposes of this description, a computer-usable or computer readable medium can be any tangible apparatus that can contain, store, communicate, propagate, and/or transport the program for use by or in connection with the instruction execution system, apparatus, device, and/or the like.

The medium can be an electronic, magnetic, optical, electromagnetic, infrared, or semiconductor system (or apparatus or device), a propagation medium, and/or the like. Examples of a computer-readable medium include, but are not limited to, a semiconductor or solid state memory, magnetic tape, a removable computer diskette, a random access memory (RAM), a read-only memory (ROM), a rigid magnetic disk and an optical disk. Current examples of optical disks include, but are not limited to, compact disk—read only memory (CD-ROM), compact disk—read/write (CD-R/W) and DVD.

A data processing system suitable for storing and/or executing program code can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or IPO devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for controlling remotely at least one controlled computer via a controlling computer, comprising:
    obtaining, by the at least one controlled computer, a set of observations of a set of actions performed by a user on a Graphical User Interface (GUI) of the controlling computer;
    automatically replicating on a GUI of the at least one controlled computer the set of actions performed by a user on a GUI of the controlling computer, wherein the controlled computer interacts directly with the GUI of the at least one controlled computer based on the set of observations, the GUI of the controlling computer being a GUI that is native to a platform of the controlling computer and the GUI of the at least one controlled computer being a GUI that is native to a platform of the at least one controlled computer, wherein the GUI of the controlling computer is different from the GUI of the at least one controlled computer and wherein the set of actions are represented differently on the GUI of the controlling computer than on the GUI of the at least one controlled computer.

2. The method of claim 1, wherein the automatically replicating comprises:
   automatically creating a representation of content of the GUI of the controlling computer;
   automatically observing actions performed by the user on the GUI of the controlling computer; and
   automatically creating a platform independent representation of the observed actions.

3. The method of claim 2, further comprising:
   sending to the at least one controlled computer the representations of the observed actions.

4. The method of claim 3, the representation of the observed action comprising:
   the type of action performed by the user; and
   a representation of the at least one GUI component on which the action has been performed,
   wherein the platform of the controlling computer is different from a platform of the controlled computer.

5. The method of claim 4, the representation of the at least one GUI component on which the action has been performed comprising a smallest representation necessary to distinguish each of the at least one GUI component from all other GUI components on the controlling computer.

6. The method of claim 5, further comprising sending from the controlled computer to the controlling computer a request for further information when a controlled computer cannot uniquely identify a GUI component from the representation of the at least the one GUI component.

7. The method of claim 6, the request for further information further comprising a complete representation of the at least one GUI component identified by the controlled computer using the representation sent by the controlling computer.

8. The method of claim 5, further comprising constructing the smallest representation with the following
   starting with an empty representation, the empty representation containing only minimal information for identifying the widget;
   identifying all GUI components that match a current representation; and
   if more than one GUI component matches the current representation, identifying a smallest subset of representation components that uniquely identify a desired GUI component.

9. A system for remotely controlling a controlled computer via a controlling computer, comprising:
   data/action capture instrumentation on the controlling computer, the controlling computer being a computer device, that causes the controlling computer to
      automatically create a representation of content of the GUI of the controlling computer,
      automatically observe a set of actions performed by a user on the GUI of the controlling computer,
      automatically create a platform independent representation of the observed actions that the controlled computer can use to directly interact with the GUI of the at least one controlled computer to perform the set of actions; and
      send to the controlled computer the representation of the observed actions,
      wherein the GUI of the controlling computer is a GUI that is native to a platform of the controlling computer and the GUI of the at least one controlled computer is a GUI that is native to a platform of the at least one controlled computer, and
      wherein the GUI of the controlling computer is different from the GUI of the at least one controlled computer and wherein the set of actions are represented differently on the GUI of the controlling computer than on the GUI of the at least one controlled computer.

10. The system of claim 9, further comprising execution instrumentation on the controlled computer for receiving the representation and replicating the actions on the controlled computer by interacting with a GUI of the controlled computer.

11. The system of claim 9, the data/action capture instrumentation further determining changes to the content of the GUI of the controlling system based on the set of actions performed by the user.

12. The system of claim 9, the representation of the observed action comprising the type of action performed by the user, and a representation of at least one GUI component on which the action has been performed,
    wherein the platform of the controlling computer is different from a platform of the controlled computer.

13. The system of claim 12, the representation of the at least one GUI component on which the action has been performed comprising a smallest representation necessary to distinguish each of the at least one GUI component from all other GUI components on the controlling computer.

14. The system of claim 13, the data/action capture instrumentation further sending from the controlled computer to the controlling computer a request for further information when the controlled computer cannot uniquely identify a GUI component from the representation.

15. The system of claim 14, the request for further information comprising a complete representation of the at least one GUI component identified by the controlled computer using the representation sent by the controlling computer.

16. A program product stored on a computer readable storage medium for remotely controlling a controlled computer via a controlling computer, the computer readable medium comprising program code for causing the controlling computer system to perform the following:
    automatically create a representation of content of the GUI of the controlling computer;
    automatically observe a set of actions performed by a user on the GUI of the controlling computer;
    automatically create a platform independent representation of the observed actions that the controlled computer can use to directly interact with the GUI of the at least one controlled computer to perform the set of actions; and
    send to the controlled computer the representation of the observed actions,
    wherein the GUI of the controlling computer is a GUI that is native to a platform of the controlling computer and the GUI of the at least one controlled computer is a GUI that is native to a platform of the at least one controlled computer, and
    wherein the GUI of the controlling computer is different from the GUI of the at least one controlled computer and wherein the set of actions are represented differently on the GUI of the controlling computer than on the GUI of the at least one controlled computer.

17. The program product of claim 16, further comprising a program product stored on a computer readable medium for causing the controlled computer to perform the following receive the representation and replicate the actions on the controlled computer by interacting with a GUI of the controlled computer.

18. The program product of claim 16, the computer readable medium further comprising program code for causing the controlling computer to perform the following: determine changes to the content of the GUI of the controlling system based on the set of actions performed by the user.

19. The program product of claim 16, the representation of the observed action comprising the type of action performed by the user, and a representation of at least one GUI component on which the action has been performed,
   wherein the platform of the controlling computer is different from a platform of the controlled computer.

20. The program product of claim 19, the representation of the at least one GUI component on which the action has been performed comprising a smallest representation necessary to distinguish each of the at least one GUI component from all other GUI components on the controlling computer.

21. The program product of claim 20, the computer readable medium further comprising program code for causing the controlling computer to perform the following: send from the controlled computer to the controlling computer a request for further information when the controlled computer cannot uniquely identify a GUI component from the representation.

22. The program product of claim 21, the request for further information comprising a complete representation of the at least one GUI component identified by the controlled computer using the representation sent by the controlling computer.

23. A method for deploying a system for remotely controlling a controlled computer via a controlling computer, comprising:
   providing a computer infrastructure being operable to:
      automatically create a representation of content of the GUI of the controlling computer;
      automatically observe a set of actions performed by a user on the GUI of the controlling computer;
      automatically create a platform independent representation of the observed actions that the controlled computer can use to directly interact with the GUI of the at least one controlled computer to perform the set of actions; and
      send to the controlled computer the representation of the observed actions,
   wherein the GUI of the controlling computer is a GUI that is native to a platform of the controlling computer and the GUI of the at least one controlled computer is a GUI that is native to a platform of the at least one controlled computer, and
   wherein the GUI of the controlling computer is different from the GUI of the at least one controlled computer and wherein the set of actions are represented differently on the GUI of the controlling computer than on the GUI of the at least one controlled computer.

* * * * *